May 5, 1964  J. R. WEAVER, JR., ETAL  3,131,950
WHEELED DOLLY WITH TILTABLE AXLE FOR LOAD LEVELING
Filed Feb. 7, 1963  5 Sheets-Sheet 1

INVENTORS
JOHN R. WEAVER, JR.
MICHEL A. PIERRAT
BY
Kenway, Jenney & Hildreth
ATTORNEYS

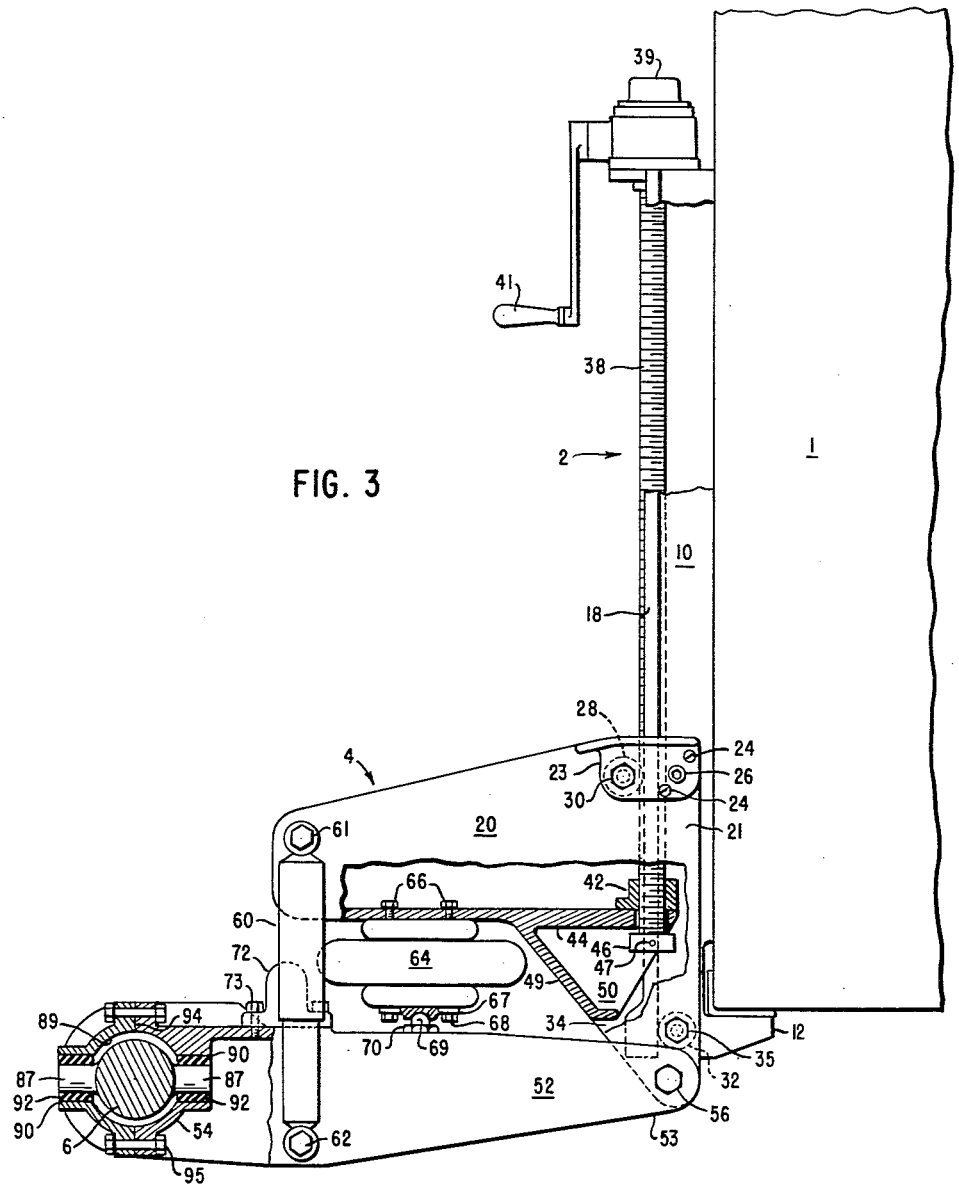

INVENTORS
JOHN A. WEAVER, JR.
MICHEL A. PIERRAT
BY
ATTORNEYS

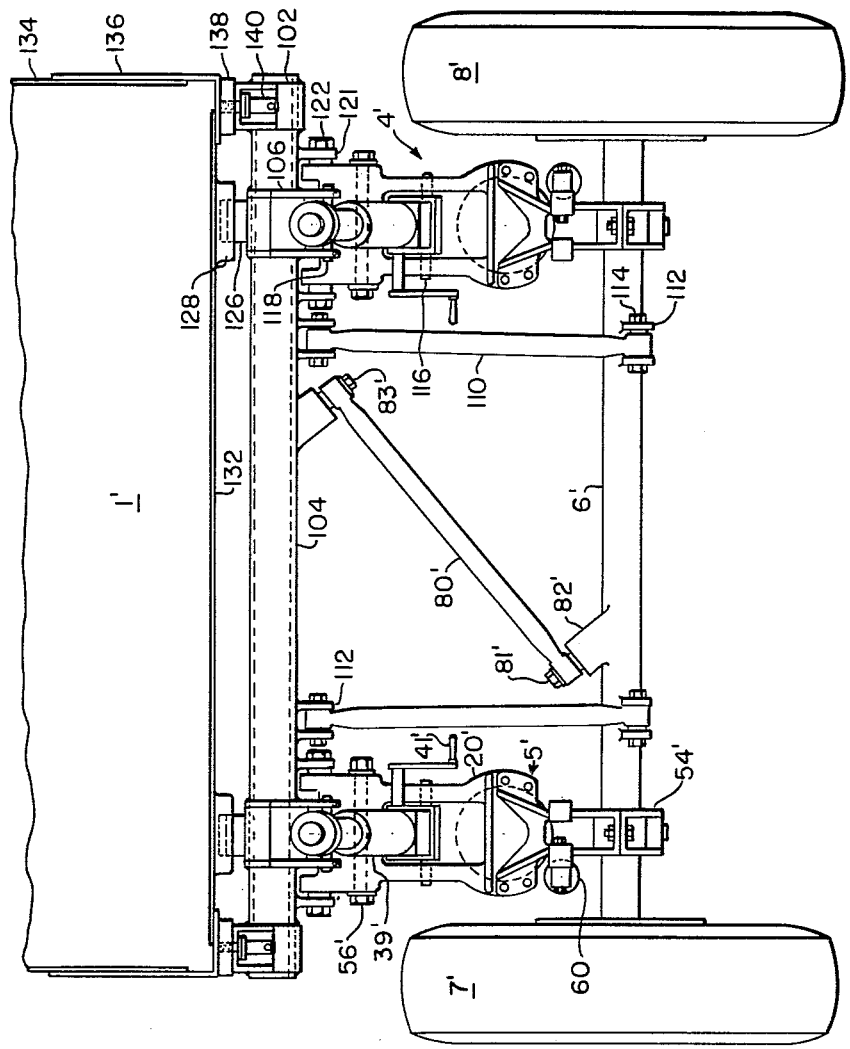

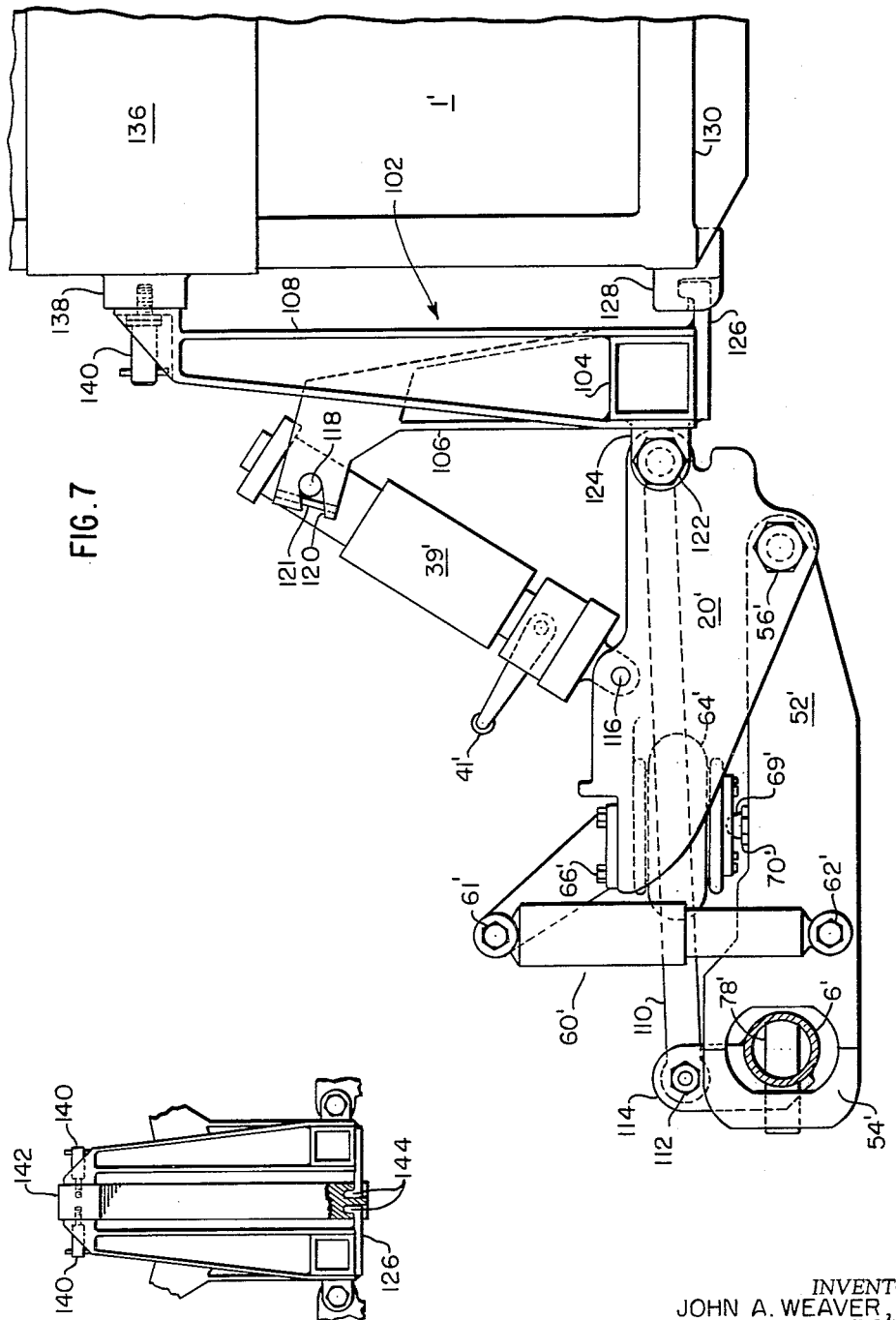

… …

United States Patent Office 3,131,950
Patented May 5, 1964

3,131,950
WHEELED DOLLY WITH TILTABLE AXLE
FOR LOAD LEVELING
John R. Weaver, Jr., Rowley, and Michel A. Pierrat,
Andover, Mass., assignors to Craig Systems, Inc., Lawrence, Mass., a corporation of Massachusetts
Filed Feb. 7, 1963, Ser. No. 256,948
6 Claims. (Cl. 280—6)

This invention relates to dollies for attachment to portable equipment or other loads, and has as its primary object the provision of a wheeled dolly for portably supporting a load in a level position on uneven terrain. It is another object of the invention to provide improved means for mounting an axle for tilting transversely of an undercarriage, to facilitate transverse leveling of a load supported thereby on transversely sloping terrain. Further objects and advantages of the invention will become apparent as the following description proceeds.

This application is a continuation-in-part of our co-pending application Serial No. 97,366, filed March 21, 1961, and now abandoned, entitled Wheeled Dolly With Tiltable Axle for Load Leveling.

In general, the invention may be carried out in a preferred embodiment thereof by supporting a desired load upon a plurality of independently-actuable jacking means, and by mounting an undercarriage assembly upon each jack for vertical adjustment relative to the load; pairs of the undercarriage assemblies are supported by an axle extending transversely therethrough and having a pair of wheels rotatably mounted thereon. According to a feature of the invention, transverse tilting of the axle with respect to the associated undercarriage assemblies is accommodated by an improved arrangement for mounting the axle. The axle is received in over-sized openings formed in the undercarriage assemblies, and is formed with pin portions extending transversely to the axis of the axle and generally horizontally, for engagement with flexible bushings mounted on the undercarriage. The axle is thus free to rotate slightly about its axis against the resilient bias of the bushing members, and may tilt transversely of the undercarriage assemblies through rotation about the pin axes. The load may be placed in a level position on terrain which slopes either longitudinally or transversely thereof, simply by independently actuating the jacks to raise or lower the undercarriage assemblies with respect to the load until it reaches a level position. The consequent tilting of the axles transversely of the undercarriage assemblies is accommodated by the improved mounting means.

The provision of pins mounted in resilient bushings provides for twisting of the axle about its longitudinal axis, under torsional loadings arising from relative rotation of the undercarriage assemblies about that axis, which would otherwise apply severe stresses to the pins. At the same time this arrangement permits the axle to tilt transversely of the undercarriage assemblies, since the pins are free to rotate about their own axes within the resilient bushings. The pins may be supported in alternate fashions; in one form, the pins extend transversely through the axle and are supported at either end by a pair of resilient bushings, and in a second form they are cantilevered by means of a single bonded bushing. The latter form allows a greater angular displacement than the former without applying undue sheer stress to the pins.

For mounting a supported load upon a first form of the dolly, the jacking means are directly attached to the load, and the undercarriage assemblies are supported by the jacking means. In an alternative form, the jacking means and undercarriage assemblies are each connected to a separate mounting frame, and to one another, to form a rigid triangular truss. The mounting frame is arranged for detachable connection to the load, and is so constructed that two dollies, when detached from a load, may be connected together to form a complete four-wheel vehicle for convenient transportation.

The mounting frame, according to a further feature, is organized about a transverse torque tube, on which are cantilevered, at transversely spaced points, a pair of load support brackets, and a pair of torque arms for connection to the jacking means and undercarriage assemblies. This arrangement is preferred for the support of box-structure loads, in that the load support brackets may be arranged at the ends of the torque tube to engage the box structure adjacent its lateral edges; the torsional loading of the dollies is thus transferred by means of the torque tube to the sidewalls of the box structure, rather than to the end walls, thus applying the load into the plane of the sidewall rather than transverse to the plane of the end wall, and consequently increasing the structural strength of the vehicle.

While the specification concludes with claims specifically pointing out and distinctly claiming the invention subject matter, it is believed that the invention will be more clearly understood from the following detailed description of a preferred embodiment thereof, referring to the accompanying drawings, in which:

FIG. 3 is a sectional view in side elevation, taken along line 3—3 of FIG. 1, looking in the direction of the arrows, and showing certain parts broken away for greater clarity;

FIG. 6 is a top plan view showing an alternative embodiment of the invention;

FIG. 7 is a sectional view in side elevation of the dolly of FIG. 6; and

FIG. 8 is a fragmentary view in side elevation illustrating the manner of interconnection of two dollies as shown in FIG. 7, for transportation without a connected load.

Figure 1:
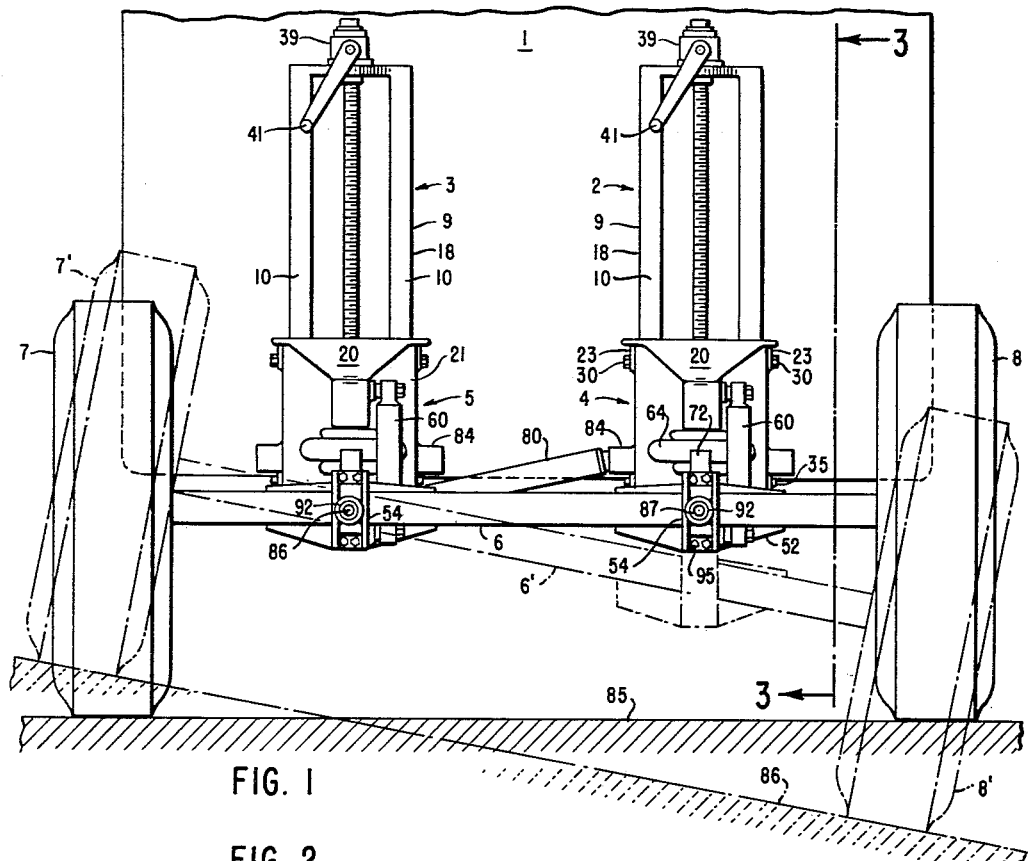
FIG. 1 is an end view in elevation of a dolly according to the invention, with an equipment container supported thereon.
Figure 2:
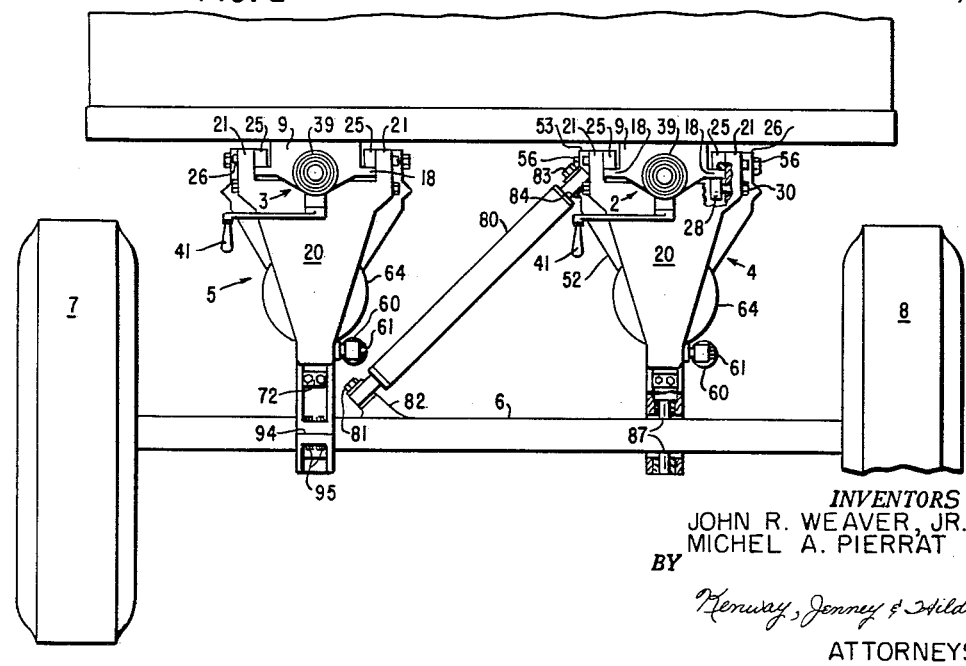
FIG. 2 is a top plan view.

In FIGS. 1–3, a single dolly, incorporating a first embodiment of the invention, is shown supporting an illustrative equipment container 1, although it will be understood that a dolly is preferably attached to either end of the container or other supported load. It will be apparent that the improved dolly may be applied to any load which it is desired to transport, although it is particularly adapted for use over rough terrain, and for supporting equipment such as electronic field stations, which it is desired to set in a level position upon such terrain. Each dolly comprises a pair of jacking means 2 and 3 having undercarriage assemblies 4 and 5, a transverse axle 6, and a pair of wheels 7 and 8 rotatably mounted on the axle in a conventional manner. As shown, the wheels are not steerably mounted on the axle, but it will be apparent that if desired they may be mounted by means of steering knuckles, and suitable steering arms and tie rods may connect the wheels with a trailer tongue attached to the axle for steering and towing the supported container.

Each of the jacking means 2 and 3 includes a channel support 9 having parallel vertically extending portions 10 joined at their lower ends by a transverse web 12. The channel support is secured to the container 1 by suitable means (not shown), which are preferably so arranged that the dolly may readily be attached to or detached from the container. Each of the channel supports is formed with vertically extending slides 18 along its transverse edges, for securing one of the carriage assemblies 4 or 5 in vertically slidable relation thereon.

Each of the undercarriage assemblies 4 includes a hollow box-section frame member 20, which terminates rearwardly in bifurcated tongues 21 for cooperation with the channel support 9 of an associated jacking means. A pair of reinforcing plates 23 are formed in the frame 20 upon opposite outer surfaces of the tongues 21, and a pair of slide blocks 25 are fastened by bolts 24 and 26 inside the tongues for sliding cooperation with the rear surfaces of the flange 18 (see FIG. 2), to support the undercarriage assemblies against counterclockwise rotation in the event the wheels are lifted from the ground during travel. The stresses of road shock and the weight of the container are not applied to the slide blocks. For supporting the structure against the torsional moments of these loads, a pair of rollers 28 are rotatably supported within the tongues 21 of each frame member by means of bolts 30, and a similar pair of rollers 32 are rotatably mounted by means of bolts 35 within a pair of triangular brackets 34, which extend downwardly from the tongues. The sets of rollers 30 and 32 cooperate with opposite surfaces of the slides 18 to support the structure against the torsional moments set up by road shock and by the supported load. The undercarriage assemblies are thus mounted in vertically-slidable relation upon the channel supports.

For adjusting the height of the container with respect to the undercarriage assemblies, a jack screw 38 is rotatably supported in a head 39 mounted on each channel support 9. A crank 41 is drivingly connected with the jack screw by suitable gearing (not shown) within the head, for manual adjustment. At its lower end, each jack screw is threadedly engaged in a nut 42 secured by bolts (not shown) on a transversely-extending web portion 44 of the frame member 20. A cup 46 is secured to the lower end of the jack screw by a pin 47 to prevent movement of the screw out of engagement with the nut. To reinforce the web 44, a transverse web 49 is cast in the frame member joining the brackets 34, and a further web 50 joins the web 49 with the web 44 and the nut 42. The web 50 extends in spaced-apart relation between the brackets 34, in a generally vertical plane.

Each of the undercarriage assemblies 4 or 5 further includes a yoke 52, which is formed with bifurcated tongues 53 at a rearward end thereof, and with an axle housing 54 at a forward end. The tongues 53 are pivotally secured upon the brackets 34 of the frame member 20 by means of bolts 56. A shock absorber 60 of a conventional type is secured at its opposite ends to the frame member 20 by a bolt 61, and to the yoke 52 by a bolt 62. An air-spring 64 is preferably interposed between each frame member and its associated yoke, although other well-known forms of springs such as coil or leaf springs, may be utilized if desired. The air-spring 64 is of a conventional self-contained construction, and no detailed description thereof is believed necessary. It is secured upon the lower surface of the frame member by means of a pair of bolts 66, and upon the upper surface of the yoke by means of a plate 67 secured to the spring by bolts 68. To allow pivotal movement of the air-spring with respect to the yoke, the plate 67 is mounted upon a ball joint 69, secured to the yoke by a threaded stud 70. The frame member 20 and the yoke 52 of each of the undercarriage assemblies are thus pivotally connected by the bolts 56, and resiliently connected by the air-springs 64 and shock absorbers 60, to form a shock-absorbent undercarriage for supporting the container 1 upon the wheels 7 and 8. Relative pivotal movement of the yoke with respect to the frame member is limited by means of a stop 72 bolted on the yoke at 73.

For stiffening the mounting of the undercarriage assemblies upon the axle 6, a radius rod 80 is secured by a bolt 81 upon a boss 82 formed in the axle, and by a bolt 83 upon a boss 84 formed in one of the frame members 20. As shown, a boss 84 is formed on each side of each of the frame members for uniformity of the castings; however, the additional bosses may be omitted if desired.

According to a feature of the invention, the axle 6 is supported in the housings 54 of the yokes 52 in an improved manner, to accommodate transverse tilting of the axle with respect to the undercarriage assemblies and the container, in a vertical plane. In FIG. 1, the dolly is shown in full lines upon a horizontal surface 85; to level the container on transversely sloping terrain, such as indicated in dotted lines 86, the jacking means 2 and 3 are independently actuated to raise the wheel 7 with respect to the wheel 8, so that the wheels and the axle assume the position shown in dotted lines at 7', 8', and 6', respectively. By thus actuating the jacks to elevate the wheels to different heights, the container is leveled while resting on an uneven surface. It will be understood that a similar dolly supporting the opposite end of the container may be adjusted so that all four wheels rest upon the ground with the axles tilted accordingly, while the container is supported thereby in a level position. To make this result possible, means are provided by which the axles may tilt transversely with respect to the undercarriage assemblies and the container to which they are secured. The axle 6 is formed with horizontally extending axially-spaced pairs of pins 86 and 87, transverse to the longitudinal axis of the axle, for supporting the axle in the axle housings. To provide a clearance space about the axle for tilting movement thereof, each of the axle housings is formed with an enlarged opening 89, of somewhat larger diameter than that of the axle. Each housing is also formed with a pair of horizontally-extending openings 90, transverse to the axis of the axle, for receiving the pins 86 and 87 with a substantial clearance therebetween. In these openings there are inserted pairs of resilient bushings 92, in which the pins 86 or 87 are inserted.

The axle may rotate slightly about its own axis, against the bias of the distorted bushings, to relieve the pins of excessive stress when the undercarriage assemblies subject them to a torsional moment acting about that axis. The mounting also permits the axle to tilt transversely with respect to the axle housings 54 when the undercarriage assemblies are adjusted to different elevations by the jacking means. To facilitate the assembly of the axle in the axle housings, the latter are split upon a vertical plane at 94, and the halves are subsequently secured by bolts 95.

Figure 5:
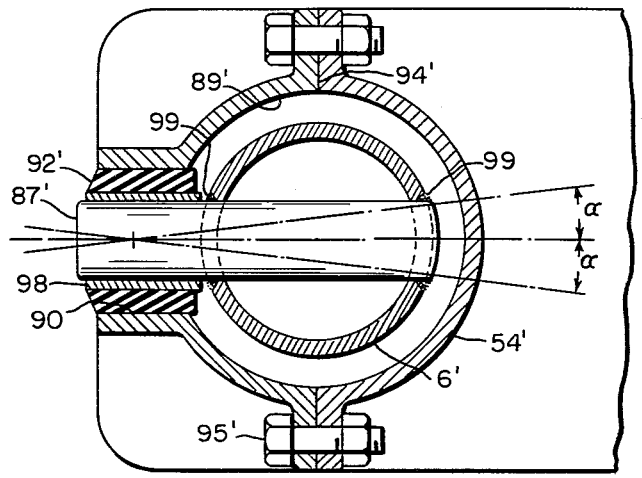
FIG. 5 is a sectional view taken along line 5—5 in FIG. 4, looking in the direction of the arrows.
Figure 4:
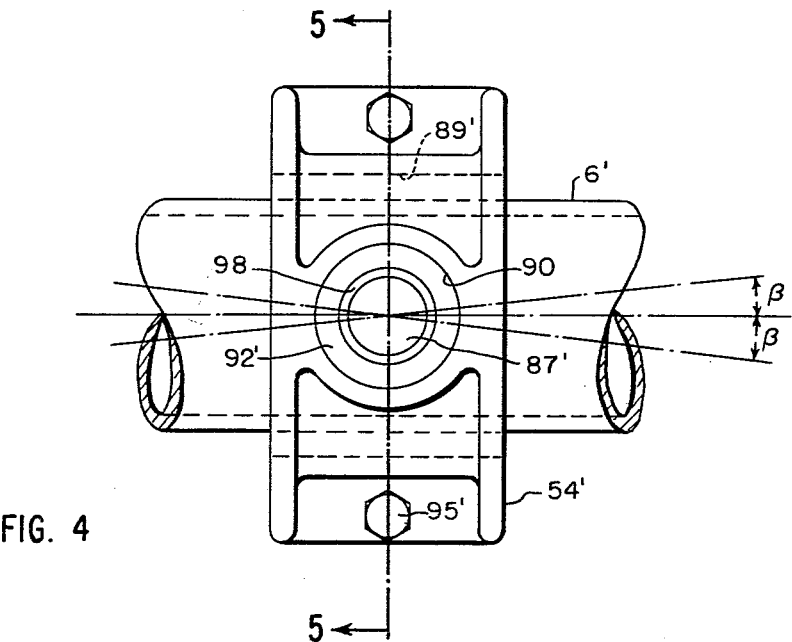
FIG. 4 is a fragmentary view in front elevation of an axle and associated housing, showing a modified form of pin mounting.

An alternative form of the pin mounting is shown in FIGS. 4 and 5, in which parts similar to those of the preceding embodiment are similarly numbered, with prime superscripts. In this form, pins 87' are each cantilevered in a single resilient bushing 92', being mounted in sleeves 98, which are bonded to the material of the bushings. The pins pass through the axle 6', and are secured therein by means of welds 99. This construction has the advantage of permitting a greater angular movement of the pins about the longitudinal axis of the axle, under torsional loading, as illustrated by angular displacements. Either pin arrangement permits tilting of the axle transversely of the undercarriage assemblies, accompanied by angular movement of the axle with respect to each housing 54', as illustrated by angular displacements in FIG. 4.

A modified dolly is shown in FIGS. 6–8, in which parts similar to those of the embodiment of FIGS. 1–3 are similarly numbered, with prime superscripts. In this embodiment, the jacks 39' and the frame members 20' are connected to a mounting frame generally designated 102; this frame is detachably connected to the load 1' illustrated as a box structure which may be used, for example, as a portable equipment shelter. The mounting frame is organized about a torque tube 104, which extends transversely of the undercarriage assemblies 4' and 5'. The frame is completed by torsion members comprising a pair of jack arms 106 and a pair of load support brackets 108, which are welded or otherwise rigidly secured to the torque tube for transmitting torsional loadings thereto. In addition to the radius arm 80', a pair of links 110 interconnect the torque tube 104 with the axle 6, being connected by means of threaded fasteners 114, received in ears 112 welded to the torque tube and the axle, to relieve the undercarriage assemblies of force components in the horizontal plane.

The jacks 39', the frame members 20' of the undercarriage assemblies, and the jack arms 106, are pivotally interconnected to form a rigid triangular truss, such that either undercarriage assembly may be raised or lowered by adjustment of its jack. Each jack is connected at one end by means of a pin 116 in the corresponding frame member, and at the opposite end by a pin 118 in a slot 120 at the upper end of the jack arm. Tapered retaining pins 121 facilitate disassembly. The bifurcated frame member 20' is connected to the torque tube 104 by means of threaded fasteners 122 received in ears 124 welded thereon.

For detachably connecting the mounting frame 102 to the box structure 1', a pair of adaptor hooks 126 are welded to the lower surface of the torque tube, and are receivable within a pair of socket members 128 secured to the box structure. Since these elements are located substantially in the plane of the bottom surface 130 of the box structure, and will therefore apply the loading in the planes of sheet members forming this surface, the hooks and sockets are located directly to the rear of the undercarriage assemblies. However, the application of loading in perpendicular direction upon the front wall 132 of the box is undesirable, because of its relative inability to sustain stress in this direction. For this reason, second points of attachment with the box are located at the upper ends of the load support brackets 108, which are located outboard of the jack arms 106, so that these loads are applied in the planes of sidewalls 134, rather than upon the front wall 132. As a convenient means of detachable mounting, L-shaped brackets 136 are secured to the front corners of the box, having threaded bosses 138 for receiving fasteners 140, which are captivated in the upper ends of the load support brackets.

Referring to FIG. 8, fragmentary portions of a pair of dollies are shown connected directly to one another by means of a dummy attachment plate 142, for convenience in transportation when not connected to a load. The bracket 142 threadedly receives the fasteners 140, and is also formed with sockets 144 at its lower end for receiving the hooks 126 of the dollies. By these means, two dollies can be conveniently transported as an integral vehicle when not attached to a load.

It will be apparent from the foregoing description of preferred embodiments thereof that the invention affords an improved dolly for portable equipment, which is adapted to render a container portable over either highways or rough terrain, and by means of which the container may be supported in a level position upon uneven terrain. The construction of the dolly is simple and rugged, and requires a minimum of maintenance. The combination of independently-actuable jacking means, together with the transversely tiltable mounting arrangement of the axle in the undercarriage assemblies, affords a simple but effective means for accurately leveling the container, regardless of the inclination assumed by the wheels and axles. Various changes and modifications will readily occur to those skilled in the art, without departing from the true spirit and scope of the invention; it is therefore intended to cover all such changes and modifications in the appended claims.

What is claimed and desired to be secured by Letters Patent of the United States is:

1. A dolly for portably supporting a load, comprising, in combination: an axle adapted to mount wheels rotatably thereon; a pair of undercarriage assemblies each comprising a frame member, a yoke pivotally mounted on said frame member, and spring means resiliently biasing said yoke and said frame member for opposite rotation about said pivotal mounting, each of said yokes formed with an axle housing having an opening receiving said axle therein with clearance therebetween; said axle formed with at least two pins spaced apart along a longitudinal axis thereof and extending transversely to said axis in generally horizontal directions; at least one resilient bushing in each axle housing rotatably supporting the respective one of said pins for tilting movement of said axle transversely of said yoke; and a pair of independently-actuable jacking means, each supporting one of said frame members for independent adjustment of the elevations of said undercarriage assemblies relative to one another, said jacking means being adapted for attachment in transversely-spaced relation to a load.

2. A dolly as recited in claim 1, in which a pair of resilient bushings is received in each of said axle housings, each of said pins extending through said axle and being supported at either end thereof in one of said pairs of bushings.

3. A dolly for portably supporting a load, comprising, in combination: an axle adapted to mount wheels rotatably thereon; a pair of undercarriage assemblies each comprising a frame member, a yoke pivotally mounted on said frame member, and spring means resiliently biasing said yoke and said frame member for opposite rotation about said pivotal mounting, each of said yokes formed with an axle housing having an opening receiving said axle therein with clearance therebetween; resilient means supporting said axle in said axle housing for tilting movement transversely of said undercarriage assemblies; and a pair of independently-actuable jacking means, each supporting one of said frame members for independent adjustment of the elevations of said undercarriage assemblies relative to one another, said jacking means being adapted for attachment in transversely-spaced relation to a load.

4. A dolly as recited in claim 3, in which said jacking means include supports receiving said frame members slidably thereon and restraining said frame members against angular movement with respect thereto.

5. A dolly as recited in claim 3, together with a mounting frame comprising a torque tube extending transversely of said dolly and torsion members extending transversely from said tube and rigidly secured thereto for transmitting torsional loadings thereto, said jacking means and said frame members being pivotally connected to said mounting frame at spaced points and pivotally connected to one another to form a triangular truss therewith, said torsion members further including means for attachment to a load for transmitting torsional loading through said torque tube to said dolly.

6. A dolly as recited in claim 5, in which said torsion members include a pair of jack arms pivotally connected to said jacking means, and a pair of load support brackets for attachment to a load, said load support brackets being spaced apart longitudinally of said tube from said jack arms.

References Cited in the file of this patent
UNITED STATES PATENTS

| | | |
|---|---|---|
| 754,985 | Flyte | Mar. 22, 1904 |
| 1,056,128 | Schuett | Mar. 18, 1913 |
| 1,340,418 | Schneider | May 18, 1920 |
| 2,974,976 | Lyall | Mar. 14, 1961 |